United States Patent [19]
Budzinski

[11] 3,777,097
[45] Dec. 4, 1973

[54] INDUCTION HEATING DEVICE FOR RING GEARS

[75] Inventor: Roger R. Budzinski, Seven Hills, Ohio

[73] Assignee: Park-Ohio Industries, Inc., Cleveland, Ohio

[22] Filed: Mar. 8, 1973

[21] Appl. No.: 339,329

[52] U.S. Cl............ 219/10.59, 219/10.73, 269/48.1, 279/2
[51] Int. Cl. .......................................... H05b 5/00
[58] Field of Search ...................... 219/10.59, 10.73, 219/10.67, 10.79, 159; 266/4 E, 5 E; 279/2; 269/47, 48.1

[56] References Cited
UNITED STATES PATENTS

| | | | |
|---|---|---|---|
| 1,645,029 | 10/1927 | Sunderland | 219/10.79 |
| 3,122,625 | 2/1964 | Lenz | 219/10.59 X |
| 3,145,128 | 8/1964 | Sharpe | 279/2 X |

Primary Examiner—Bruce A. Reynolds
Attorney—James H. Tilberry et al.

[57] ABSTRACT

An induction heating device for heating metal ring gears having an outer cylindrical periphery including the teeth and an inner cylindrical surface which is generally concentric with the periphery and with a central axis. The ring gear is rotated about the axis in close proximity with an encircling inductor whereby the teeth of the gear are inductively heated for subsequent quench hardening. In this device there is an improvement including a rotatable support member having at least three outwardly movable, pivoted arms which can be adjusted into a set position and means for allowing limited movement of the arms with respect to the set position.

15 Claims, 4 Drawing Figures

INDUCTION HEATING DEVICE FOR RING GEARS

This invention relates to the art of induction heating and more particularly an induction heating device for inductively heating ring gears.

The invention is particularly applicable for inductively heating the teeth of a ring gear for use on the flywheel of a motor vehicle preparatory to quench hardening of the outer teeth and it will be described with particular reference thereto; however, it should be appreciated that the invention has much broader applications and may be used for inductively heating various types of ring-shaped workpieces.

In making the flywheel of a motor vehicle, there is provided a separate ring gear for engaging the starting motor. This ring gear is essentially a large diameter ring-shaped workpiece having an internal generally cylindrical surface for mounting the gear onto the flywheel and an external perihery containing a seris of spaced teeth. These gear teeth are to be heated and quench hardened. Various devices have been developed for this purpose. In some instances, the ring gear is placed within an indexing mechanism and the teeth are inductively heated individually or in groups. This process requires a substantial amount of time; therefore, it has been suggested to rotate the ring gear about its central axis and inductively heat the teeth by an encircling inductor, magnetically coupled with the teeth of the gear. This procedure has been somewhat successful; however, the supporting mechanism for the gear has been relatively complex. The gear was generally placed on a support plate and stops were moved outwardly on the support plate to engage the gear. Thereafter, the gear was inductively heated. Since thermal expansion occurred during the heating operation, the gear was often distorted. In addition, it was a relatively complex procedure to load and unload the ring gear onto the rotating plate.

The present invention overcomes the disadvantages of prior devices for supporting the ring gear for rotatable movement with respect to an encircling inductor.

In accordance with the present invention, the rotating support member includes at least three ring engaging locators and means for positioning the locators in a given position to define a circle generally concentric with the rotatable axis of the support member. In accordance with the invention, there is provided means for allowing limited movement of the locators from their initial positions to allow for insertion and removal of the ring gear. This limited movement allows thermal expansion of the ring gear without undue distortion.

The locators are preferably pivoted arms with locators on their outer end; however, these arms can be replaced by outwardly movable elements wherein the elements are positioned in initial positions to define the desired engaging pattern and with at least one of the elements having means for allowing limited movement thereof to compensate for thermal expansion and to allow loading of the workpiece into the fixture.

The primary object of the present invention is the provision of a device for supporting a ring-shaped workpiece, which device allows easy loading and unloading of the ring-shaped workpiece and allows for thermal expansion during induction heating of the workpiece.

Another object of the present invention is the provision of a fixture for supporting a ring-shaped workpiece with respect to an encircling inductor, which device includes at least three radially movable workpiece engaging elements which have a generally fixed position, but which can move slightly to allow for insertion and removal of the workpiece and for thermal expansion thereof.

These and other objects and advantages will become apparent from the following description taken together with the accompanying drawings in which.

Figure 1:
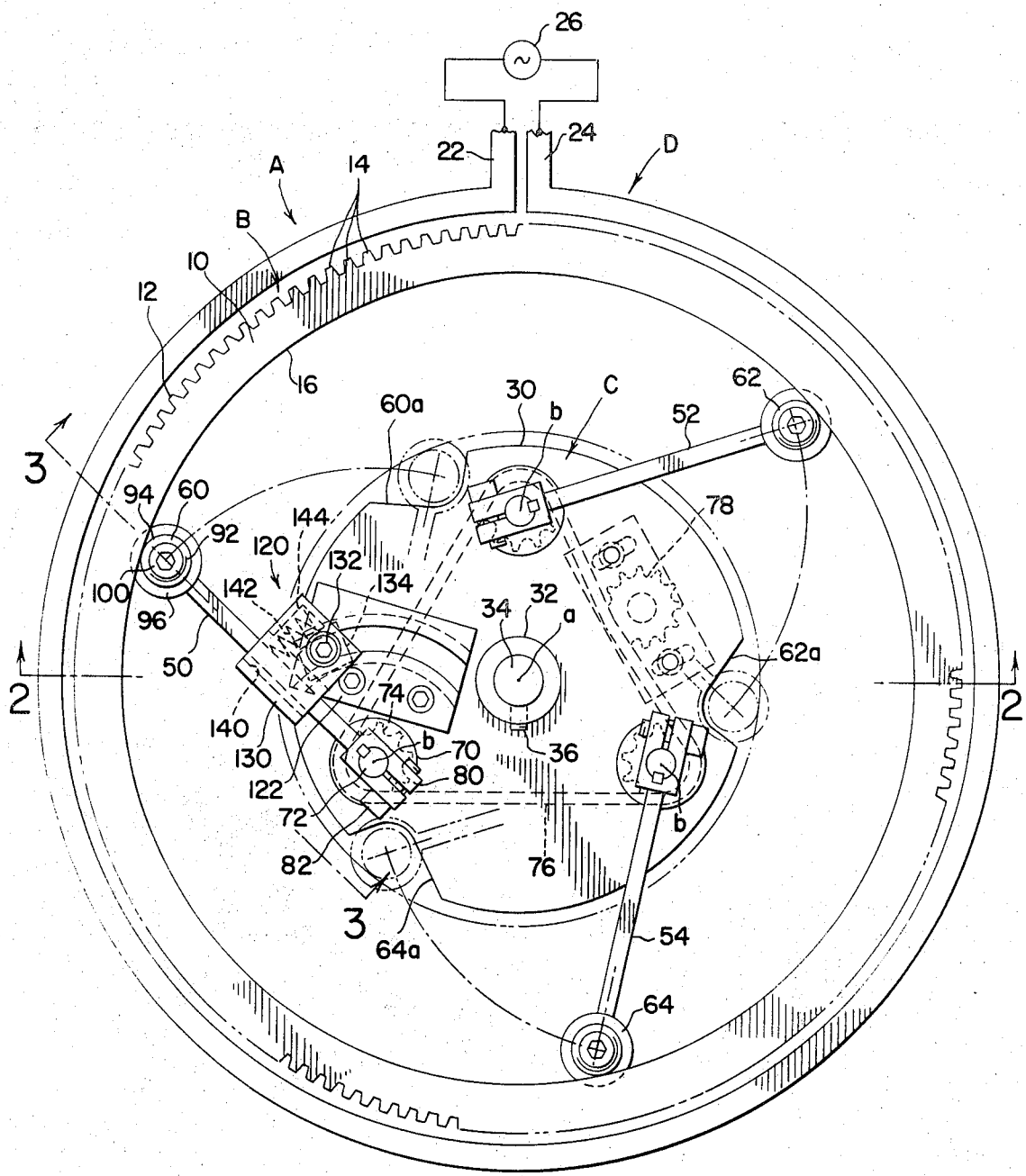
FIG. 1 is a top elevational view showing, somewhat schematically, the preferred embodiment of the present invention.
Figure 2:
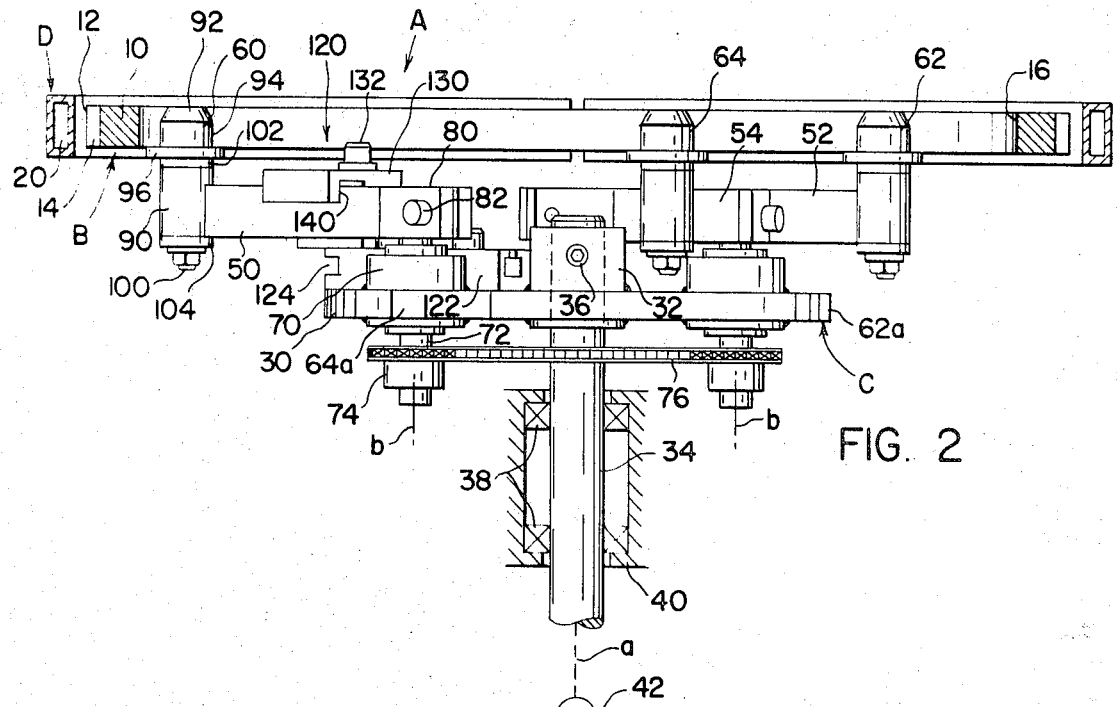
FIG. 2 is a partially cross-sectioned view taken generally along line 2—2 of FIG. 1.
Figure 3:
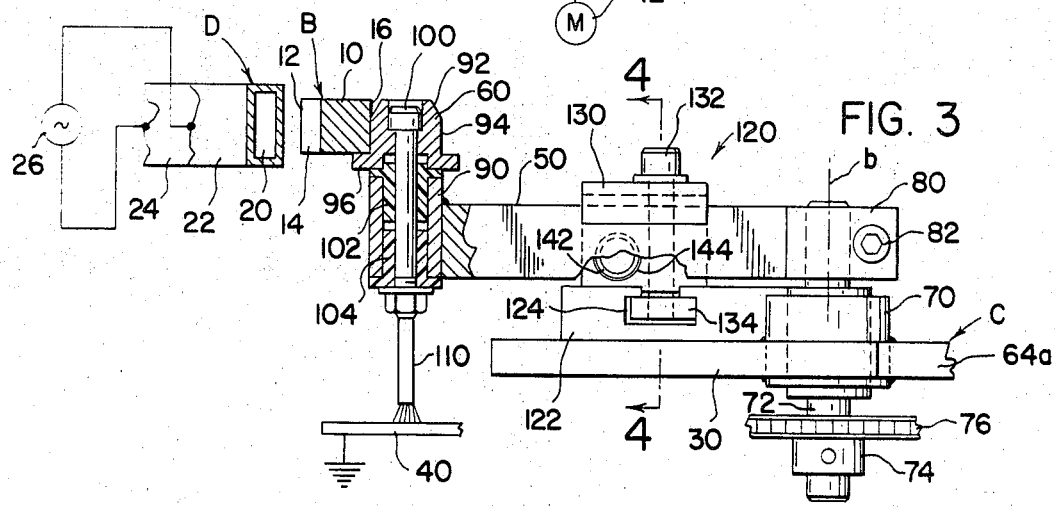
FIG. 3 is an enlarged, partial cross-sectional view taken generally along line 3—3 of FIG. 1; and, FIG. 4 is a partial cross-sectional view taken generally along line 4—4 of FIG. 3.

Referring now to the drawings wherein the showings are for the purpose of illustrating a preferred embodiment of the invention only, and not for the purpose of limiting same, the figures illustrate an induction heating installation A for inductively heating the outer periphery of a ring-shaped workpiece B in the form of a ring gear having a body portion 10, an outer periphery 12 with a plurality of teeth 14, and an inner cylindrical surface 16. The gear B has a central axis a about which it is rotated by a support and rotating mechanism C to cause induction heating when an inductor D is energized. This inductor encircles outer periphery 12 and is positioned to be magnetically coupled with the various teeth 14 as the ring gear B is rotated about axis a. In accordance with normal practice, the inductor D includes a central coolant passage 20 and a pair of closely spaced leads 22, 24 connected across the output of an alternating current power supply, schematically represented as a generator 26. Supporting and rotating mechanism C rotates the workpiece adjacent inductor D while the generator 26 energizes the inductor. After a desired time, the teeth 14 are heated to an appropriate temperature for subsequent quench hardening by a quenching device, not shown, which does not form a part of the present invention. In some instances, the heating operation is for the purpose of expanding the workpiece B so that it can be cooled and shrunk around the flywheel.

Referring now to the support and rotating mechanism B which forms the preferred embodiment of the present invention, this mechanism includes a generally flat support member of plate 30 having a central hub 32 with a shaft 34 secured thereto for rotation about axis a. A set screw 36 locks the shaft 34 with respect to hub 32 so that the shaft may rotate within spaced bearings 38 supported by a fixed base 40. The support member is rotated during the heating operation by a schematically illustrated, selectively operated motor 42.

In accordance with the preferred embodiment of the invention, mechanism C includes three locator members or arms 50, 52 and 54 each of which carry, at their outer end, a workpiece engaging button 60, 62, 64, respectively. The locator members and their respective buttons are substantially identical in structure; therefore, only the locator member or arm 50 and its associated button 60 will be described in detail. This description will apply equally to the other locator members and their associated workpiece engaging buttons.

Arm 50 is pivotally supported on member 30 to pivot about an axis b. This pivotal movement is provided by a hub 70 and a shaft 72 journalled therein. At the lower end of the shaft and below support member 30 there is provided a sprocket 74 which engages an endless member, such as chain 76, for pivoting each of the locator members or arms 50, 52 and 56 in unison. The arms have substantially the same length and are pivoted at axes b which are symmetrically positioned with respect to central axis a and at the same radial outward spacing from axis a. Consequently, as the arms 50, 52 and 54 are rotated in unison by chain 76, they define a selected circle which is concentric with the central axis. This axis is also the axis of the ring gear B aand the inductor C so that the total mechanism is basically concentric with the central axis. Of course, gears, belts, cams or other mechanisms could be used for moving the arms in unison to define the desired outward position of the locator buttons for a specific workpiece. When a chain is used, it may be desirable to provide an idler sprocket 78, shown in FIG. 1, for adjusting the tension in the chain.

To pivotally mount the arm 50, there is provided a clamp 80 which includes a bolt 82 for clamping the arm 50 onto shaft 72 for movement by sprocket 74.

Referring now in more detail to the workpiece engaging button 60, this button is supported within boss 90 at the end of arm 50 and includes a head 92 having a cylindrical surface 94 for engaging the inner cylindrical surface 16 of ring gear B and a flange 96 adapted to engage the lower portion of the gear to hold the gear in the proper vertical position with respect to inductor D. A bolt 100 extends through insulation sleeves 102, 104 for holding the head 92 onto the outermost end of arm 50. To prevent induced currents from flowing through the mechanism C, head 92 is insulated from the arm 50 by the previously mentioned insulation sleeves and there is provided a brush 110 formed from electrically conductive material for creating an electrical connection between rotating head 92 and the grounded base 40 of the installation A.

Figure 4:
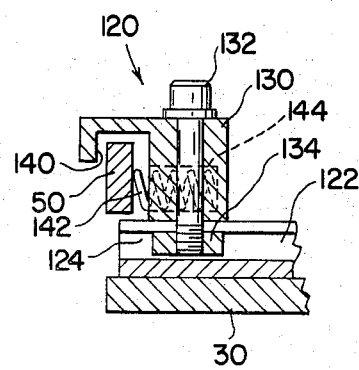

As different sized ring gears are to be supported by the supporting and rotating mechanism C, the buttons 60, 62 and 64 are positiond in a manner to define a circle generally corresponding to the particular cylindrical surface 16 of the ring gear. This is done by the adjusting mechanism 120 best shown in FIGS. 1 and 4. This mechanism includes a fixed block 122 secured onto support member 30 and adjacent one of the arms, in this instance, arm 50. Since the other arms move in unison with arm 50, the position and movement of the other arms are controlled by this single adjusting mechanism 120. Block 122 includes an arcuately shaped T-slot 124 having a center corresponding with the center b of the arm pivoting shaft 72. The bolt 132 receives a lower nut 134 and rides within the T-slot 124. In this manner, the adjustable block 130 may be shifted in an arcuate direction to define the general position of the buttons 60, 62 and 64. This adjustable block includes an overhanging stop 140 which limits the outermost position of the buttons. A compression spring 142 supported within a bore 144 of adjustable block 130 biases the arm 50 toward stop 140. During the heating operation, spring 142 maintains a spring force urging buttons 60, 62 and 64 against the surface 16. For loading, the spring 142 allows retraction of the button a slight distance to disengage the ring gear. The rearward movement may be sufficient to allow the ring gear to pass over the flanges 96 of the various buttons; however, this is not necessary.

In operation, bolt 132 is loosened which allows movement of adjustable block 130 with respect to block 122 supported on the support member 30. Without a ring gear on the mechanism C, spring 142 forces arm 50 against stop 140. The three arms are moved in unison to a position wherein the buttons define a circle greater than the circle inscribed by cylindrical surface 16. At that time, bolt 132 is tightened to lock the block 130 with respect to block 122. The position of the buttons is such that they can be moved manually between a position with arm 50 against stop 140 and a position with arm 50 against the other side of block 130 which receives the spring 142. This adjustment must be sufficient to allow for easy loading of the ring gear B. The ring gear is resting upon flanges 96 and the arms are released. They then seek the position shown in FIG. 1 with the arm 50 spaced from stop 140 and, indeed, generally centrally positioned with respect to its two extreme locations. Then, motor 42 rotates the ring gear B and generator 26 energizes inductor B. The heating operation is, thus, initiated. During the heating, ring gear B expands. This is permitted in accordance with the invention by the space between arm 50 and stop 140. Spring 142 maintains outward pressure on the buttons 60, 62 and 64 during the heating and expansion of the ring gear. After the heating operation, the arms are then manually retracted to the allowed inner position and the ring gear is removed.

In accordance with the preferred embodiment of the invention, the flanges 96 of buttons 60, 62 and 64 are positioned below the ring gear when the buttons are retracted; however, as previously mentioned it is not outside the invention to retract them a further distance to allow clearance of the flanges with respect to the ring gear. If a different size ring gear is to be inductively heated and supported on the mechanism C, the bolt 132 is again loosened and the adjusting procedure is repeated. It is seen that arms 50, 52 and 54 are positioned by movable blocks 130 to a desired position which allows only slight movement of the arms for loading and expansion during heating. Stop 140 prevents the arms from moving outwardly an excessive amount when there is no ring gear in position.

Having thus defined my invention, I claim:

1. In an induction heating device for heating a metal ring having an outer cylindrical periphery and an inner cylindrical surface, generally concentric with said periphery and having a central axis, said device including means for rotating said metal ring about said axis and an inductor adjacent said periphery and inductively coupled with said metal ring for heating said ring as it is rotating, the improvement comprising: a support member, means for mounting said support member for rotation about said axis, at least three concurrently movable locators supported on said support member and each movable in a direction generally radially of said axis for engagement with said cylindrical surface, means for causing said locators to move in unison to define an adjustable locator circle generally concentric with said axis, means for positioning said concurrently movable locators in a selected position for creating a selected locator circle, and means for allowing limited movement of said locators while they are in said selected position.

2. The improvement as defined in claim 1 wherein said movement allowing means includes a stop means associated with at least one of said locators for limiting movement in one direction and a spring for biasing said locator toward said stop means.

3. The improvement as defined in claim 2 wherein said locators each include an arm having first and second ends and a workpiece engaging element on said first end of said arm, and means at said second end of said arm for pivotally mounting said arm onto said support member.

4. The improvement as defined in claim 1 wherein said locators each include an arm having first and second ends and a workpiece engaging element on said first end, and means at said second end of said arm for pivotally mounting said arm onto said support member.

5. The improvement as defined in claim 4 including drive means interconnecting said arms for causing said arms to move in unison.

6. The improvement as defined in claim 5 wherein said drive means includes a rotatable member fixed to each of said arms at said second ends thereof and an endless drive element interconnecting said members whereby rotation of one of said members drives the other members in unison.

7. The improvement as defined in claim 4 wherein said positioning means includes a first member for limiting movement of one of said arms in a first direction, a second member carried by said support member, and means for adjustably locking said first member with respect to said second member.

8. The improvement as defined in claim 7 wherein said limited movement allowing means is a stop carried by said first element and a spring means for biasing said one arm toward said stop.

9. In an induction heating device for heating a metal ring having an outer cylindrical periphery and an inner cylindrical surface, generally concentric with said periphery and having a central axis, said device including means for rotating said metal ring about said axis and an inductor adjacent said periphery and inductively coupled with said metal ring for heating said ring as it is rotating, the improvement comprising: a support member, means for mounting said support member for rotation about said axis, at least three arms pivotally mounted on said support member and having workpiece engaging elements, means for pivoting said arms in unison to define a circle concentric with said axis, means for positioning said arms in a selected position for defining a selected circle generally corresponding to said cylindrical surface, and means for allowing limited movement of said arms in said selected position.

10. The improvement as defined in claim 9 wherein said positioning means includes a first member for limiting movement of one of said arms in a first direction, a second member carried by said support member, and means for adjustably locking said first member with respect to said second member.

11. The improvement as defined in claim 10 wherein said limited movement allowing means is a stop carried by said first element and a spring means for biasing said one arm toward said stop.

12. In an induction heating device for heating a metal ring having an outer cylindrical periphery and an inner cylindrical surface, generally concentric with said periphery and having a central axis, said device including means for rotating said metal ring about said axis and an inductor adjacent said periphery and inductively coupled with said metal ring for heating said ring as it is rotating, the improvement comprising: a support member, means for mounting said support member for rotation about said axis, at least three workpiece engaging members carried by said support member, means for adjusting said members in a direction generally radially of said axis, means for positioning said members in a desired position defining a circle generally concentric with said axis, and means for allowing limited movement of at least one of said members in a direction generally radially of said axis.

13. The improvement as defined in claim 12 including a stop for limiting radially outward movement of one of said members and spring means for biasing said one member toward said stop.

14. The improvement as defined in claim 13 including means for adjusting said stop with respect to said support member.

15. In an induction heating device for heating a metal ring having an outer cylindrical periphery and an inner cylindrical surface, generally concentric with said periphery and having a central axis, said device including means for rotating said metal ring about said axis and an inductor adjacent said periphery and inductively coupled with said metal ring for heating said ring as it is rotating, the improvement comprising: a support member, means for mounting said support member for rotation about said axis, at least three ring engaging locators supported on said support member, means for securing said locators in a given location to define a locator circle generally concentric with said axis and matching said cylindrical surface, and spring means for biasing said locators against said cylindrical surface during heating by said inductor.

* * * * *